July 18, 1961  D. I. BOLEF ET AL  2,993,176
MASER
Filed Aug. 19, 1957  3 Sheets-Sheet 1

WITNESSES

INVENTORS
Peter F. Chester &
Dan I. Bolef
BY
ATTORNEY

ity in the resonant cavity may be varied also. If the frequency of the signal fed into the cavity is not of the correct frequency to be amplified, or if no signal is introduced at all, the electrons in the upper energy state, by interaction with their surroundings, will revert to a lower energy level over a time interval called the "spin-lattice relaxation time."

United States Patent Office 2,993,176
Patented July 18, 1961

2,993,176
MASER
Dan I. Bolef, Pittsburgh, and Peter F. Chester, Penn Township, Allegheny County, Pa., assignors to Westinghouse Electric Corporation, East Pittsburgh, Pa., a corporation of Pennsylvania
Filed Aug. 19, 1957, Ser. No. 679,028
11 Claims. (Cl. 330—4)

This invention relates to devices employing solids for amplifying or generating electromagnetic energy and more particularly to a solid state maser employing a paramagnetic material for which the resonant frequency in a fixed magnetic field is a function of the angle which the crystalline axis makes with the magnetic field; that is, a paramagnetic material having an anisotropic $g$-value.

Generally speaking, "masers" may be defined as devices for amplifying or generating electromagnetic energy by utilizing molecules in an excited state. Interaction between these excited molecules and an electromagnetic field produces additional radiation and hence amplification by "stimulated" emission. The operation of masers such as the one described herein is dependent upon the fact that in paramagnetic materials the electrons may be in different energy states. These states may be thought of as arising from the interaction of the magnetic moments (associated with spins) of the electrons with internal or external fields. We may therefore refer to them as electron "spin states." The energies of these electron spin states may be varied by an external magnetic field; and the energy difference between two given electron spin states is, in part, determined by the magnitude of this external magnetic field.

The populations of the electron spin states in a paramagnetic material may be inverted by a process called "adiabatic rapid passage." In this process, electrons in the paramagnetic material may be subjected to an electromagnetic field of constant frequency while, at the same time, they are subjected to a varying magnetic field so that the magnetic field corresponding to resonance at the microwave frequency to which the paramagnetic material is subjected is traversed once. Thus, the magnetic field which is initially far off resonance is swept continuously through the value required for resonance and then far off resonance on the other side. If the conditions are met for adiabatic rapid passage, the populations of the electron spin states are inverted. An alternative form of adiabatic rapid passage employs a constant magnetic field. In this latter process, the paramagnetic material is subjected to an electromagnetic field which varies in frequency whereby the frequency is swept from a value on one side of resonance to a value on the other side of resonance.

If a paramagnetic material having an excess electron population in the upper energy state produced by adiabatic rapid passage is placed in a resonant cavity situated in a magnetic field of the correct magnitude, and if electromagnetic energy of proper frequency is fed into the cavity, the electrons in the higher energy state will revert to the lower energy state, thereby releasing energy which produces an effect corresponding to amplification of the original electromagnetic energy fed into the cavity. In order to release the energy of the electrons in the upper state to produce amplification, however, the original signal fed into the cavity must be of an appropriate frequency which is determined by the difference in the energy levels of the electrons in the upper and lower states; and this energy difference is, in turn, dependent upon the strength of the external magnetic field applied to the paramagnetic material. Thus, by varying the strength of this external magnetic field, the frequency at which the paramagnetic material will release its energy In prior masers employing the principle of adiabatic rapid passage, either the frequency of electromagnetic energy fed into a cavity containing paramagnetic material had to be swept through resonance, or the external magnetic field applied to the paramagnetic material had to be varied so that the magnetic field corresponding to resonance at the microwave frequency to which the paramagnetic material was subjected was traversed once. It is an object of this invention to provide an adiabatic rapid passage maser in which neither the applied electromagnetic energy nor the external magnetic field need be varied.

More generally, an object of this invention is to provide a maser employing the principle of adiabatic rapid passage to achieve an effect corresponding to amplification of electromagnetic energy.

A further object of the invention is to provide an adiabatic rapid passage maser employing a magnetic salt having an anisotropic $g$-value.

Another object of the invention is to provide a solid state electromagnetic amplification device in which a paramagnetic material having an anisotropic $g$-value is physically rotated to effect adiabatic rapid passage.

A still further object of the invention is to provide a solid state electromagnetic amplification device in which a rotating magnetic field, applied to a sample of paramagnetic material having an anisotropic $g$-value is used to produce amplification of electromagnetic energy as a result of population inversion caused by adiabatic rapid passage.

As will become apparent from the following detailed description, operation of the present invention is dependent upon the fact that in certain paramagnetic materials having a $g$-value which is anisotropic the conditions for paramagnetic resonance are dependent upon the angle which a crystal axis of the material makes with an external magnetic field. That is, in a fixed magnetic field and at a fixed microwave frequency, one angle may correspond to a condition below resonance, while another angle may correspond to a condition above resonance. Therefore, by rapidly changing the angle that the crystal axis of the paramagnetic material makes with an external magnetic field, the material may be made to undergo adiabatic rapid passage, thereby producing an inverted population distribution suitable for amplification of electromagnetic energy fed into a resonant cavity within which the paramagnetic material is positioned. In the foregoing description of operation it was assumed that a single crystal of paramagnetic material was employed so that an excess electron population periodically shifted between upper and lower energy levels as a result of successive adiabatic rapid passage cycles. In actual practice, however, the paramagnetic material which is rotated will contain many crystals which are oriented at different angles so that some crystals will always be at an angle suitable for amplification while others will be at an angle suitable for adiabatic rapid passage, and continuous operation of the maser will be achieved.

The above and other objects and features of the invention will become apparent from the following detailed description taken in connection with the accompanying drawings which form a part of this specification and in which.

Figures 1, 3:
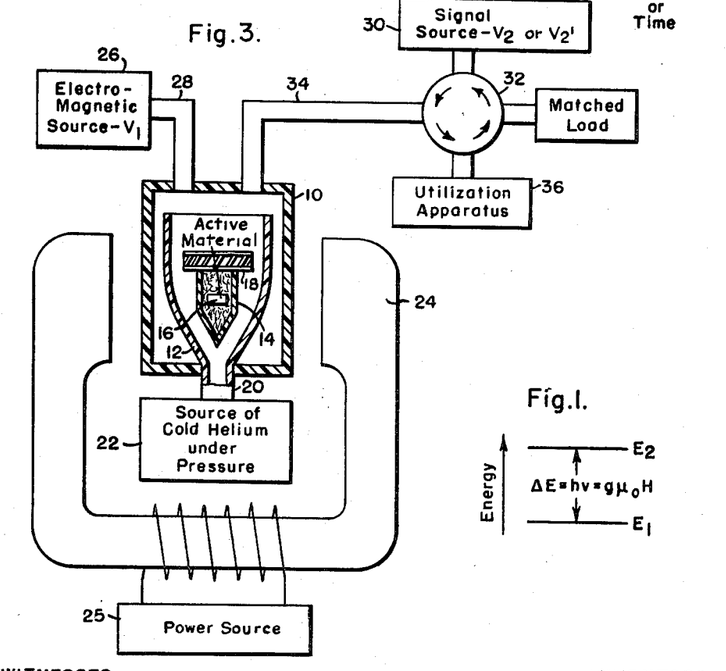
FIGURE 1 is a graphical illustration of two of the energy levels of an electron in a paramagnetic material.
FIG. 3 is a schematic illustration of one embodiment of the invention.

Referring to FIG. 1, two energy levels of an electron in a paramagnetic material situated in a magnetic field are indicated by the horizontal lines identified as $E_1$ and $E_2$. Some of the electrons in the paramagnetic material will be in the lower energy state, $E_1$, while others will be in the higher energy state, $E_2$. The paramagnetic material is in a normal or relaxed condition when there is an excess electron population in the lower energy state, $E_1$, over that in the upper energy state, $E_2$. Electrons in the energy states $E_1$ and $E_2$ can interact within a resonant cavity with an electromagnetic radiation field of appropriate frequency and either absorb energy from the radiation field while advancing to a state of greater energy, or, under the influence of the radiation field, can give up some of their energy and drop to a state of lower energy. The amount of energy thus transferred (i.e., $E_2-E_1$) is related to the frequency of the radiation field and the magnetic field by the equation:

$$E_2-E_1=h\nu=g\mu_0 H$$

where:

$h$ = Planck's constant;

$\nu$ = frequency of electromagnetic energy fed into the cavity;

$g$ = electron splitting factor;

$\mu_0$ = Bohr magneton; and $H$ = strength of applied magnetic field.

In some paramagnetic materials, the electron "splitting factor," $g$, is constant for all angles of an incident magnetic field. For others, however, (called paramagnetic materials having an anisotropic $g$-value) the electron splitting factor $g$ is not constant, but varies as a function of the angle between the direction of a crystal axis and an applied magnetic field. Considering the foregoing equation, it can readily be appreciated that the quantity $(E_2-E_1)$ may be varied by changing the $g$-value and this, in turn, may be altered by changing the angle between a crystal axis and a magnetic field applied to the paramagnetic material.

If an electron in the lower energy state $E_1$ is situated in an electromagnetic field of proper frequency and polarization, it may absorb energy and rise to the upper energy state $E_2$. An electron in the upper state, on the other hand, may give up energy to the electromagnetic field while dropping to the lower state. The probability of either transition is the same. Therefore, whether a system of many electrons exhibits a net absorption or emission of energy depends upon whether more electrons are in the upper or lower energy state. All such systems when allowed to come to thermal equilibrium (i.e., are relaxed) have more electrons in the lower energy state $E_1$ than in $E_2$; and, hence, are absorptive.

In order for the paramagnetic material to be emissive and release energy, there must be an excess electron population in the upper energy state $E_2$. An excess population in the upper state may be produced in the following way: Paramagnetic material having an anisotropic $g$-value is positioned within a resonant cavity which may resonate at two frequencies, $V_1$ and $V_2$. The paramagnetic material is rotated (rapidly enough to satisfy conditions for adiabatic rapid passage) within the cavity and is subjected to an external magnetic field while electromagnetic energy of frequency $V_1$ and of amplitude large enough to satisfy conditions for adiabatic rapid passage is continuously fed into the cavity. As the paramagnetic material rotates within the cavity, the electrons within its crystals will undergo adiabatic rapid passage at angles corresponding to resonance at frequency $V_1$ and will be raised to the upper energy level $E_2$. Assuming that no electromagnetic energy other than that of frequency $V_1$ is fed into the cavity, the electrons in the upper energy state $E_2$ will revert to the lower energy state $E_1$ over a time interval corresponding to the spin-lattice relaxation time. Furthermore, if the speed of rotation is correct the transition from state $E_1$ to state $E_2$ and back to state $E_1$ may occur twice during each full 360° revolution of the paramagnetic salt.

However, if it is assumed that a signal of frequency $V_2$ to be amplified is fed into the cavity, then the electrons in the paramagnetic material will still be raised from state $E_1$ to state $E_2$ by adiabatic rapid passage. However, instead of reverting to state $E_1$ over the spin-lattice relaxation time, they will now release their energy to the electromagnetic signal of frequency $V_2$, thereby amplifying this signal which is thereafter conveyed from the cavity.

Figure 2:
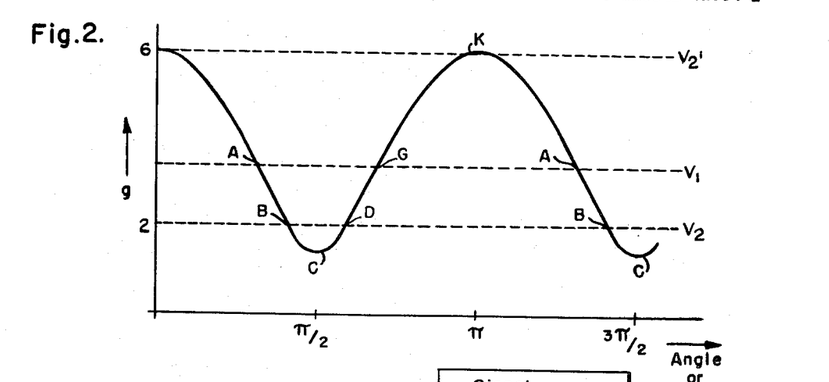
FIG. 2 is a graph illustrating the operation of a maser of the type described in this specification.

A graphical illustration of the process is shown in FIG. 2 where the $g$-value of an anisotropic paramagnetic material is plotted as a function of its angle of rotation. Since an anisotropic $g$ material is used in the present invention, it follows that the $g$-value will vary in accordance with the angle of rotation, though not necessarily in the exact manner shown.

During the period between G and A in FIG. 2, a spin magnetization builds up parallel to the external magnetic field, meaning that the excess electron population moves to the lower energy level $E_1$. The fact that the $g$-value is very large for a considerable part of this period results in a rapid build-up of an excess population in state $E_1$ over state $E_2$. That is, since $(E_2-E_1)$ is dependent upon the value of $g$ in accordance with the foregoing equation, a large value of $g$ makes for a rapid excess population build-up in the lower state. At point A, adiabatic rapid passage through resonance at frequency $V_1$ occurs in the paramagnetic material so that an excess electron spin population is produced in the upper energy level $E_2$, and the paramagnetic material is now in a radiant condition. At point B, the paramagnetic material in this radiant state can resonate with the signal of frequency $V_2$ (for a short period of time) and will, therefore, amplify it by stimulated emission. Depending upon what happens to the energy levels at point C where $g$ reaches its minimum value and approaches zero, the radiant state may still exist at point D, in which case further amplification of the signal of frequency $V_2$ will result. A further adiabatic rapid passage occurs at point G. This serves no useful purpose but must be accepted because of the symmetry of the curves. Thereafter, the cycle is repeated. Because of the low $g$-value in the period A to G, losses due to spin-lattice relaxation in this period are small. The result is that the time between G and A, when $g$ is large, does not have to be very much greater than the time between A and G, when $g$ is small.

The essential condition for adiabatic rapid passage are that the resonance corresponding to $V_1$ be traversed in a time $\delta$ which is much shorter than $T_1$, the spin-lattice relaxation time, and much longer than $(\gamma H_v)^{-1}$, where $H_v$ is the amplitude of the microwave field of frequency $V_1$ and $\gamma$ is the ratio of magnetic moment to angular momentum of the electron. The amplitude $H_v$ must be sufficient to cause saturation.

The times involved are such that for likely materials $\delta$ would have to be $10^{-4}$ second or shorter. This would involve rotation at a speed of the order of 100 cycles per second or faster. The period G to A should be about equal to $T_1$; thus $T_1$ would have to be about $10^{-2}$ seconds for 100 cycles per second or $10^{-3}$ seconds for 1000 cycles per second. This would involve operation at helium temperatures. The period A to B should be less than $T_1$.

An alternative method of operating the device is possible under certain conditions and has the advantage that $V_1$ can be less than $V_2'$. This method depends on the possibility of thermalizing the spin system very rapidly (by means of a device to be described below) at points such as D in FIG. 2. The spin system then leaves D in a "relaxed" state and is inverted by adiabatic rapid passage at frequency $V_1$ at point G. Amplification occurs at frequency $V_2'$ at point K. Because of the zero slope of the curve at point K each crystal is available for amplification for a larger fraction of a revolution than in the first described method of operation. The rotational time is now made shorter than the normal $T_1$. Liquid helium operation is still necessary.

The device by which thermalization is achieved very rapidly at D will depend on the particular working substance used. One way is to "dope" the working substance with a paramagnetic ion which has a very much shorter relaxation time $(T_1)$ than the host and which has a paramagnetic transition of the same frequency as that of the host at the particular orientation D. Cerium has been used in this application.

One embodiment of the invention for effecting adiabatic rapid passage by mechanical rotation is shown in FIG. 3 and comprises a resonant cavity 10 having a funnel-shaped tube 12 of Teflon or other non-conducting material positioned therein. Positioned within the tube 12 is a capsule 14 of non-conducting material having a specimen 16 of paramagnetic material positioned therein. As shown, the specimen of paramagnetic material is encased within capsule 14 by Fiberglas; however, it may be supported within the capsule by any suitable means. On the upper end of capsule 14 is affixed a small turbine wheel 18 of non-conducting material, the arrangement being such that if a fluid under pressure is introduced into tunnel 12 through necked-down portion 20, then the resulting release of pressure will rotate turbine wheel 18 and the paramagnetic material 16, thereby producing the desired rotation and at the same time supporting the weight of the capsule and contents.

Since the paramagnetic material usually must be at liquid helium temperatures for successful operation of the maser, a source of cold helium under pressure 22 is introduced into the necked-down portion 20, thereby providing a convenient refrigerant while at the same time producing the necessary rotation of the paramagnetic material.

The paramagnetic material is subjected to the influence of an external magnetic field produced by an electromagnet 24 which is energized from a power source 25. At the same time, a source of electromagnetic energy 26 of frequency $V_1$ is fed into cavity 10 through waveguide 28. The source of energy to be amplified 30 of frequency $V_2$ is also fed into cavity 10 through a circulator 32 and waveguide 34. The circulator 32, well known in the art, will permit the signal from source 30 to reach cavity 10 and will permit the amplified signal from the cavity to reach a wave energy utilization device 36, but it will not permit noise from circuit 36 to reach the cavity 10.

In order that the time δ be not excessively short, it is desirable to work with a paramagnetic substance having the narrowest possible lines and long $T_1$ and yet showing a sufficiently large anisotropy in g for successful operation. The best substances known at present would appear to be sodium plutonyl acetate, $$(CH_3COO)_3NaPuO_2)$$

and $Mg_3Bi_2(NO_3)_2 \cdot 24H_2O$ doped with 1% $Co^{2+}$.

In the operation of the apparatus of FIG. 3, the polycrystalline paramagnetic sample 16 is continuously rotated while electromagnetic energy of frequency $V_1$ and of large amplitude is fed into the cavity under the influence of the magnetic field produced by magnet 24. Consequently, the conditions for adiabatic rapid passage, described above, are met and the signal of frequency $V_2$ from source 30 is amplified and applied to the utilization device 36.

Figure 4:
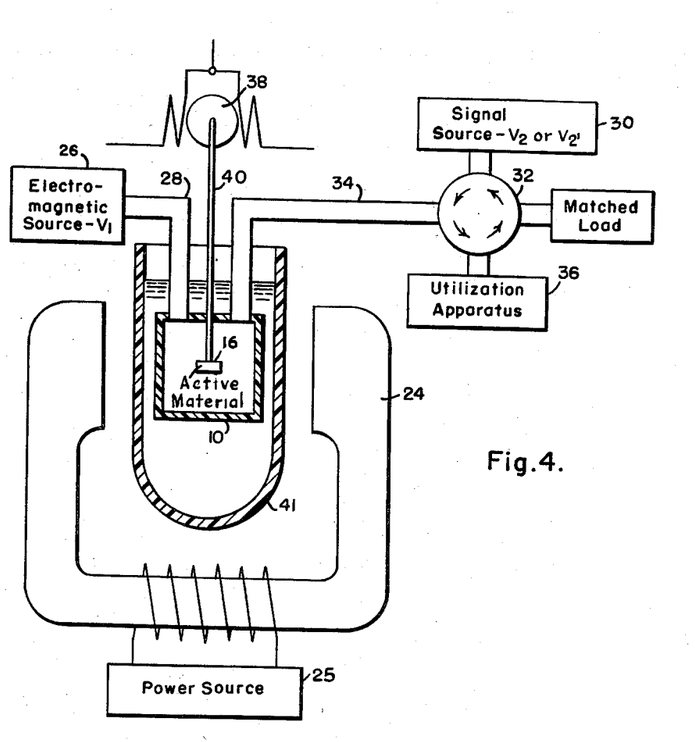
FIG. 4 is a schematic diagram of the preferred embodiment of the invention.

Another embodiment of the invention is shown in FIG. 4 where elements corresponding to those shown in FIG. 3 are identified by like reference numerals. The essential difference between the embodiments shown in FIGS. 3 and 4 is that in FIG. 4 the paramagnetic sample 16 is mechanically rotated by an electric motor 38 which is connected to the paramagnetic sample 16 through a shaft 40. Since a refrigerant is not used in FIG. 4 to rotate the paramagnetic sample, the entire resonant cavity 10 is immersed in a dewar vessel 41 containing a refrigerant such as liquid helium or liquid hydrogen. Other than these minor differences, the operation of the embodiment shown in FIG. 4 is the same as that shown in FIG. 3.

Figure 5:
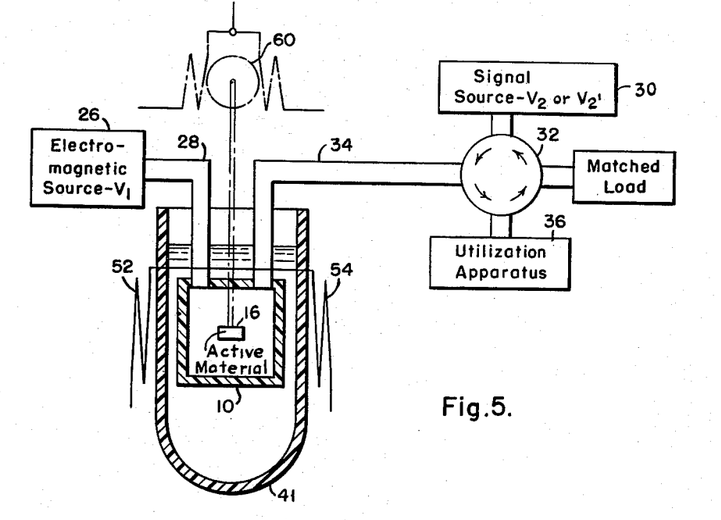
FIG. 5 is a schematic diagram of still another embodiment of the invention.
Figure 6:
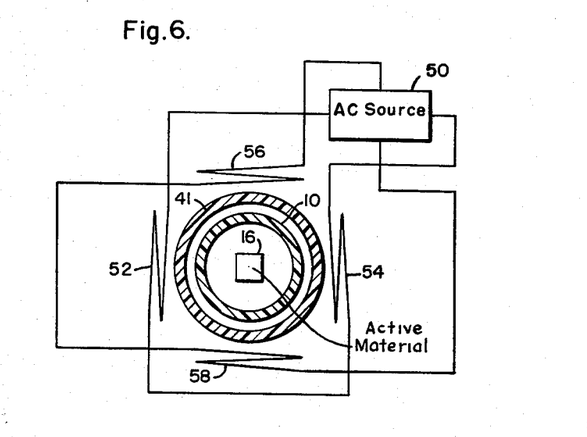
FIG. 6 is a top view of the embodiment of the invention shown in FIG. 5.

A still further embodiment of the invention is shown in FIGS. 5 and 6 where, again, elements corresponding to those shown in FIG. 3 are identified by like reference numerals. In this case, however, the paramagnetic material having an anisotropic g-value remains stationary and the external magnetic field is rotated. This is accomplished, for example, in FIGS. 5 and 6 by two sets of Helmholtz coils disposed at right angles with respect to each other. By applying a sine wave signal from source 50 to coils 52 and 54; and by applying a sine wave signal from the same source to coils 56 and 58 which is 90° out-of-phase with respect to the signal applied to coils 52 and 54, a rotating magnetic field of constant amplitude is produced. The effect is obviously the same as maintaining the magnetic field stationary and physically rotating the paramagnetic material. In either case, the conditions for adiabatic rapid passage are met so that a signal of frequency $V_2$ from source 30 is continuously amplified.

It will be obvious that mechanical rotation of the paramagnetic material and electrical rotation of the external magnetic field may be combined into one maser. This is shown schematically in FIG. 5 by an electric motor 60 connected to the paramagnetic sample 16. In this way, using high rotational rates both for the paramagnetic material and for the field, adiabatic rapid passage can be achieved with materials which require higher rotational rates than could be achieved with material or field rotation alone.

Finally it should be pointed out that the advantage that this maser has over other solid state masers is a very wide bandwidth which here is determined only by the response of the cavity at frequency $V_2$ or $V_2'$ which is much wider than the bandwidth effective in other masers, viz the resonance line-width.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In apparatus employing stimulated emission of radiation and employing paramagnetic material in a magnetic field having relative rotation with respect thereto, the combination of means forming a doubly resonant cavity, paramagnetic material comprising sodium plutonyl acetate positioned within the cavity, said paramagnetic material having two discreet energy levels of electrons and having an anisotropic g-value, said paramagnetic material having a predetermined spin-lattice relaxation time at a predetermined temperature of operation of the material, means for subjecting said paramagnetic material to an external magnetic field of predetermined substantially constant magnitude and having relative rotation with respect thereto at a predetermined speed of rotation, said paramagnetic material including a plurality of paramagnetic crystals all of the same chemical composition in which the separation between the two energy levels and the material resonant frequency at which the material absorbs and radiates energy is a function of the strength of the magnetic field and of the angle which the crystalline axis makes with said external magnetic field, means for feeding electromagnetic wave energy of a first frequency and of at least a predetermined amplitude into said cavity, said first frequency corresponding to the material resonant frequency in accordance with the instant separation between the two energy levels while the crystalline axis of any crystal makes a predetermined first angle with respect to said external magnetic field, said first angle being momentarily assumed by the axes of at least some of said plurality of crystals as the material undergoes relative rotation with respect to the external magnetic field, said wave energy of said first frequency being of sufficient amplitude whereby the material of said last named crystals absorbs energy from said wave energy of first frequency while the crystal axes have said first angle and electrons are raised to the upper of said two energy levels by adiabatic rapid passage, and at any moment as the material undergoes relative rotation with respect to said external magnetic field the axes of some of said crystals being at said predetermined first angle whereby electrons are continuously raised in the material to the upper of said two energy levels by adiabatic rapid passage and an inverted population distribution of electrons between said two energy levels is maintained in some of said plurality of crystals, means for cooling the cavity and paramagnetic material therein to said predetermined temperature, and means for conducting a signal of a second frequency to and from said cavity, said second frequency corresponding to the material resonant frequency while the crystal axis is at a second angle with respect to the external magnetic field, at any moment as relative rotation occurs between the material and the external magnetic field the axes of some of said crystals being at said second angle, the speed of rotation being preselected in accordance with said predetermined temperature whereby the time interval between the occurrence of the first angle in any one crystal and the occurrence of the second angle in said one crystal is short compared to the spin-lattice relaxation time of the material, said paramagnetic material giving up energy to said signal of second frequency thereby amplifying said signal.

2. In apparatus employing stimulated emission of radiation and employing paramagnetic material in a magnetic field having relative rotation with respect thereto, the combination of means forming a doubly resonant cavity, paramagnetic material comprising material having the formula $Mg_3Bi_2(NO_3)_2 \cdot 24H_2O$ doped with 1% $CO^{2+}$ positioned within the cavity, said paramagnetic material having two discreet energy levels of electrons and having an anisotropic $g$-value, said paramagnetic material having a predetermined spin-lattice relaxation time at a predetermined temperature of operation of the material, means for subjecting said paramagnetic material to an external magnetic field of predetermined substantially constant magnitude and having relative rotation with respect thereto at a predetermined speed of rotation, said paramagnetic material including a plurality of paramagnetic crystals all of the same chemical composition in which the separation between the two energy levels and the material resonant frequency at which the material absorbs and radiates energy is a function of the strength of said external magnetic field and of the angle which the crystalline axis makes with said external magnetic field, means for feeding electromagnetic wave energy of a first frequency and of at least a predetermined amplitude into said cavity, said first frequency corresponding to the material resonant frequency in accordance with the instant separation between the two energy levels while the crystaline axis of any crystal makes a predetermined first angle with respect to said external magnetic field, said first angle being momentarily assumed by the axes of at least some of said plurality of crystals as the material undergoes relative rotation with respect to the external magnetic field, said wave energy of first frequency being of sufficient amplitude whereby the material of said last named crystals absorbs energy from said wave energy of said first frequency while the crystal axes have said first angle and electrons are raised to the upper of said two energy levels by adiabatic rapid passage, at any moment as the material undergoes relative rotation with respect to said external magnetic field the axes of some of said crystals being at said predetermined first angle whereby electrons are continuously raised in the material to the upper of said two energy levels by adiabatic rapid passage and an inverted population distribution of electrons between said two energy levels is maintained in some of said plurality of crystals, means for cooling the cavity and paramagnetic material therein to said predetermined temperature, and means for conducting a signal of a second frequency to and from said cavity, said second frequency corresponding to the material resonant frequency while the crystal axis is at a second angle with respect to the external magnetic field, at any moment as relative rotation occurs between the material and the external magnetic field the axes of some of said crystals being at said second angle, the speed of rotation being preselected in accordance with said predetermined temperature whereby the time interval between the occurrence of said first angle in any one crystal and the occurrence of the second angle in said one crystal is short compared to the spin-lattice relaxation time of the material, said paramagnetic material giving up energy to said signal of second frequency thereby amplifying said signal.

3. Apparatus for amplifying electromagnetic wave energy by stimulated emission of radiation and employing paramagnetic material in a magnetic field having relatice rotation with respect thereto comprising, in combination, means forming a doubly resonant cavity, paramagnetic material having two discreet energy levels of electrons and having an anistropic $g$-value positioned within the cavity, said paramagnetic material being selected in accordance with the spin-lattice relaxation time thereof at a predetermined temperature of operation of the material and in accordance with the speed of said rotation, means for subjecting said paramagnetic material to an external magnetic field of predetermined direction and substantially constant magnitude, said paramagnetic material including a plurality of paramagnetic crystals all of the same chemical composition in which the separation between the two energy levels and the material resonant frequency at which the material absorbs and radiates energy is a function of the strength of the external magnetic field and of the angle which the crystalline axis makes with said external magnetic field, means operatively connected to the paramagnetic material for rotating said paramagnetic material at a predetermined speed within said cavity and within said external magnetic field, means for feeding electromagnetic wave energy of a first frequency and of at least a predetermined amplitude into said cavity, said first frequency corresponding to the material resonant frequency in accordance with the instant separation between the two energy levels while the crystalline axis of any crystal makes a predetermined first angle with respect to said external magnetic field, said first angle being momentarily assumed by the axes of at least some of said plurality of crystals as the material is rotated, said wave energy of first frequency being of sufficient amplitude whereby the material in said last named crystals undergoes adiabatic rapid passage and absorbs energy from said wave energy of first frequency while the crystal axes have said first angle and electrons are raised to the upper said two energy levels by the process of adiabatic rapid passage, at any moment as the material rotates within said external magnetic field the axes of some of said crystals being at said predetermined first angle whereby electrons are continuously raised to the upper of said two energy levels by adiabatic rapid passage and an inverted population distribution of electrons between said two energy levels is maintained in some of said plurality of crystals, means for cooling the cavity and paramagnetic material therein to said predetermined temperature, and means for conducting a signal of a second frequency to and from said cavity, said second frequency corresponding to the material resonant frequency while the crystal axis is at a second angle with respect to the external magnetic field, at any moment as the material rotates within said external magnetic field the axes of some of said crystals being at said second angle, the speed of rotation being preselected in accordance with said predetermined temperature and said selected paramagnetic material whereby the time interval between the occurrence of the first angle in any one crystal and the occurrence of the second angle in said one crystal is short compared to the spin-lattice relaxation time of the material, said paramagnetic material giving up energy to said signal of second frequency thereby amplifying said signal.

4. In apparatus employing stimulated emission of radiation and employing paramagnetic material in a magnetic field having relative rotation with respect thereto, the combination of means forming a doubly resonant cavity, paramagnetic material having two discreet energy levels of electrons and having an antistropic $g$-value positioned within the cavity, said paramagnetic material being selected in accordance with the spin-lattice relaxation time thereof at a predetermined temperature of operation of the material and in accordance with the speed of said rotation, means for subjecting said paramagnetic material to an external magnetic field of predetermined substantially constant magnitude and having relative rotation with respect thereto at a predetermined speed of rotation, said paramagnetic material including a plurality of paramagnetic crystals all of the same chemical composition in which the separation between the two energy levels and the material resonant frequency at which the material absorbs and radiates energy is a function of the strength of the magnetic field and of the angle which the crystalline axis makes with said external magnetic field, means for feeding electromagnetic wave energy of a first frequency and of at least a predetermined amplitude into said cavity, said first frequency corresponding to the material resonant frequency in accordance with the instant separation between the two energy levels while the crystalline axis of any crystal makes a predetermined first angle with respect to said external magnetic field, said first angle being momentarily assumed by the axes of at least some of said plurality of crystals as the material undergoes relative rotation with respect to the magnetic field, said wave energy of first frequency being of sufficient amplitude whereby the material in said last named crystals undergoes adiabatic rapid passage and absorbs energy from said wave energy of first frequency while the crystal axes have said first angle and electrons are raised to the upper of said two energy levels by the process of adiabatic rapid passage, at any moment as the material undergoes relative rotation with respect to said external magnetic field the axes of some of said crystals being at said predetermined first angle whereby electrons are continuously raised to the upper of said two energy levels by adiabatic rapid passage and an inverted population distribution of electrons between said two energy levels is maintained in some of said plurality of crystals, means for cooling the cavity and paramagnetic material therein to said predetermined temperature, and means for conducting a signal of a second frequency to and from said cavity, said second frequency corresponding to the material resonant frequency while the crystal axis is at a second angle with respect to the external magnetic field, at any moment as the material undergoes relative rotation with respect to said external magnetic field the axes of some of said crystals being at said second angle, the speed of rotation being preselected in accordance with said predetermined temperature and said selected paramagnetic material whereby the time interval between the occurrence of the first angle in any one crystal and the occurrence of the second angle in said one crystal is short compared to the spin-lattice relaxation time of the material, said paramagnetic material giving up energy to said signal of second frequency thereby amplifying said signal.

5. Apparatus for amplifying electromagnetic wave energy by stimulated emission of radiation and employing paramagnetic material in a magnetic field having relative rotation with respect thereto comprising, in combination, means forming a doubly resonant cavity, paramagnetic material having two discreet energy levels of electrons and having an anisotropic $g$-value positioned within the cavity, said paramagnetic material being selected in accordance with the spin-lattice relaxation time thereof at a predetermined temperature of operation of the material and in accordance with the speed of said rotation, means for subjecting said paramagnetic material to an external magnetic field of predetermined direction and substantially constant magnitude, said paramagnetic material including a plurality of paramagnetic crystals all of the same chemical composition in which the separation between the two energy levels and the material resonant frequency at which the material absorbs and radiates energy is a function of the strength of the magnetic field and of the angle which the crystalline axis makes with said external magnetic field, rotatable mounting means for said paramagnetic material, motor means operatively connected to said rotatable mounting means for rotating said mounting means and said paramagnetic material at a predetermined speed within said cavity and within said external magnetic field, means for feeding electromagnetic wave energy of a first frequency and of at least a predetermined amplitude into said cavity, said first frequency corresponding to the material resonant frequency in accordance with the instant separation between the two energy levels while the crystalline axis of any crystal makes a predetermined first angle with respect to said external magnetic field, said first angle being momentarily assumed by the axes of at least some of said plurality of crystals as the material is rotated, said wave energy of first frequency being of sufficient amplitude whereby the material in said last named crystals undergoes adiabatic rapid passage and absorbs energy from said wave energy of first frequency while the crystal axes have said first angle and electrons are raised to the upper of said energy levels by the process of adiabatic rapid passage, at any moment as the material rotates within said external magnetic field the axes of some of said crystals being at said predetermined first angle whereby electrons are continuously raised to the upper of said two energy levels by adiabatic rapid passage and an inverted population distribution of electrons between said two energy levels is maintained in some of said plurality of crystals, means for cooling the cavity and paramagnetic material therein to said predetermined temperature, and means for conducting a signal of a second frequency to and from said cavity, said second frequency corresponding to the material resonant frequency while the crystal axis is at a second angle with respect to the external magnetic field, at any moment as the material rotates within said external magnetic field the axes of some of said crystals being at said second angle, the speed of rotation being preselected in accordance with said predetermined temperature and said selected paramagnetic material whereby the time interval between the occurrence of the first angle in any one crystal and the occurrence of the second angle in said one crystal is short compared to the spin-lattice relaxation time of the material, said paramagnetic material giving up energy to said signal of second frequency thereby amplifying said signal.

6. In apparatus for amplifying electromagnetic wave energy by stimulated emission of radiation and employing paramagnetic material in a magnetic field having relative rotation with respect thereto, in combination, means forming a doubly resonant cavity, paramagnetic material having two discreet energy levels of electrons and having an anisotropic g-value positioned within the cavity, said paramagnetic material being selected in accordance with the spin-lattice relaxation time thereof at a predetermined temperature of operation of the material and in accordance with the speed of said rotation, means for subjecting said paramagnetic material to an external magnetic field of predetermined direction and substantially constant magnitude, said paramagnetic material including a plurality of paramagnetic crystals all of the same chemical composition in which the separation between the two energy levels and the material resonant frequency at which the material absorbs and radiates energy is a function of the strength of the magnetic field and of the angle which the crystalline axis makes with said external magnetic field, a fluid passageway extending into said cavity, a capsule containing said paramagnetic material positioned within said passageway, a turbine wheel connected to said capsule whereby fluid flowing through said passageway will rotate said wheel and the capsule connected thereto at a predetermined speed, means for injecting a fluid refrigerant into said passageway, means for feeding electromagnetic wave energy of a first frequency and of at least a predetermined amplitude into said cavity, said first frequency corresponding to the material resonant frequency in accordance with the instant separation between the two energy levels while the crystalline axis of any crystal makes a predetermined first angle with respect to said external magnetic field, said first angle being momentarily assumed by the axes of at least some of said plurality of crystals as the material is rotated, said wave energy of first frequency being of sufficient amplitude whereby the material in said last named crystals undergoes adiabatic rapid passage and absorbs energy from said wave energy of first frequency while the crystal axes have said first angle and electrons are raised to the upper of said two energy levels by the process of adiabatic rapid passage, at any moment as the material rotates within said external magnetic field the axes of some of said crystals being at said predetermined first angle whereby electrons are continuously raised to the upper of said two energy levels by adiabatic rapid passage and an inverted population distribution of electrons between said two energy levels is maintained in some of said plurality of crystals, said fluid refrigerant cooling the cavity and paramagnetic material therein to a predetermined temperature, and means for conducting a signal of a second frequency to and from said cavity, said second frequency corresponding to the material resonant frequency while the crystal axis is at a second angle with respect to the external magnetic field, at any moment as the material rotates within said external magnetic field the axes of some of said crystals being at said second angle, the speed of rotation being preselected in accordance with said predetermined temperature and said selected paramagnetic material whereby the time interval between the occurrence of the first angle in any one crystal and the occurrence of the second angle in said one crystal is short compared to the spin-lattice relaxation time of the material, said paramagnetic material giving up energy to said signal of second frequency thereby amplifying said signal.

7. Apparatus for amplifying electromagnetic wave energy by stimulated emission of radiation and employing paramagnetic material in a magnetic field having relative rotation with respect thereto comprising, in combination, means forming a doubly resonant cavity, paramagnetic material having two discreet energy levels of electrons and having an anisotropic g-value positioned within the cavity, said paramagnetic material being selected in accordance with the spin-lattice relaxation time thereof at a predetermined temperature of operation of the material and in accordance with the speed of said rotation, an electromagnet disposed in predetermined position with respect to said cavity and the material therein, energizing means for said electromagnet to set up an external magnetic field of predetermined direction and substantially constant magnitude in and around said material, said paramagnetic material including a plurality of paramagnetic crystals all of the same chemical composition in which the separation between the two energy levels and the material resonant frequency at which the material absorbs and radiates energy is a function of the strength of the magnetic field and is a function of the angle which the crystalline axis makes with said external magnetic field, a fluid passageway extending into said cavity, a capsule containing said paramagnetic material positioned within said passageway, a turbine wheel connected to said capsule whereby fluid flowing through said passageway rotates said wheels and the capsule connected thereto at a predetermined speed, means for injecting a fluid refrigerant into said passageway to rotate said wheel and capsule, means for feeding electromagnetic wave energy of a first frequency and of at least a predetermined amplitude into said cavity, said first frequency corresponding to the material resonant frequency in accordance with the instant separation between the two energy levels while the crystalline axis of any crystal makes a predetermined first angle with respect to said external magnetic field, said first angle being momentarily assumed by the axes of at least some of said plurality of crystals as the material is rotated, said wave energy of first frequency being of sufficient amplitude whereby the material in said last named crystals undergoes adiabatic rapid passage and absorbs energy from said wave energy of first frequency while the crystal axes have said first angle and electrons are raised to the upper of said two energy levels by the process of adiabatic rapid passage, at any moment as the material rotates within said external magnetic field the axes of some of said crystals being at said predetermined first angle whereby electrons are continuously raised to the upper of said two energy levels by adiabatic rapid passage and an inverted population distribution of electrons between said two energy levels is maintained in some of said plurality of crystals, said fluid refrigerant cooling the cavity and paramagnetic material therein to said predetermined temperature, and means for conducting a signal of a second frequency to and from said cavity, said second frequency corresponding to the material resonant frequency while the crystal axis is at a second angle with respect to the external magnetic field, at any moment as the material rotates within said external magnetic field the axes of some of said crystals being at said second angle, the speed of rotation being preselected in accordance with said predetermined temperature and said selected paramagnetic material whereby the time interval between the occurrence of the first angle in any one crystal and the occurrence of the second angle in said one crystal is short compared to the spin-lattice relaxation time of the material, said paramagnetic material giving up energy to said signal of second frequency thereby amplifying said signal.

8. Apparatus for amplifying electromagnetic wave energy by stimulated emission of radiation and employing paramagnetic material in a magnetic field having relative rotation with respect thereto comprising, in combination, means forming a doubly resonant cavity, stationary paramagnetic material having two discreet energy levels of electrons and having an anisotropic g-value positioned within said cavity, said paramagnetic material being selected in accordance with the spin-lattice relaxation time thereof at a predetermined temperature of operation of the material and in accordance with the speed of said rotation, means for subjecting said paramagnetic material to an external magnetic field rotating at a predetermined speed and having a predetermined substantially constant magnitude and plane of rotation, said paramagnetic material including a plurality of paramagnetic crystals all of the same chemical composition in which the separation between the two energy levels and the material resonant frequency at which the material absorbs and radiates energy is a function of the strength of the magnetic field and is a function of the angle which the crystalline axis makes with said external magnetic field, means for feeding electromagnetic wave energy of a first frequency and of at least a predetermined amplitude into said cavity, and first frequency corresponding to the material resonant frequency in accordance with the instant separation between the two energy levels while the crystalline axis of any crystal makes a predetermined first angle with respect to said external magnetic field, said first angle being momentarily assumed by the axes of at least some of said plurality of crystals as the magnetic field rotates with respect to the paramagnetic material, said wave energy of said first frequency being of sufficient amplitude whereby the material in said last named crystals undergoes adiabatic rapid passage and absorbs energy from said wave energy of first frequency while the crystal axes have said first angle and electrons are raised to the upper of said two energy levels by the process of adiabatic rapid passage, at any moment as the magnetic field rotates with respect to the material the axes of some of said crystals being at said predetermined first angle whereby electrons are continuously raised to the upper of said two energy levels by adiabatic rapid passage and an inverted population distribution of electrons between said two energy levels is maintained in some of said plurality of crystals, means for cooling the cavity and paramagnetic material therein to said predetermined temperature, and means for conducting a signal of a second frequency to and from said cavity, said second frequency corresponding to the material resonant frequency while the crystal axis is at a second angle with respect to the external magnetic field, at any moment as the magnetic field rotates with respect to said paramagnetic material the axes of some of said crystals being at said second angle, the speed of rotation being preselected in accordance with said predetermined temperature and said selected paramagnetic material whereby the time interval between the occurrence of said first angle in any one crystal and the occurrence of the second angle in said one crystal is short compared to the spin-lattice relaxation time of the material, said paramagnetic material giving up energy to said signal of second frequency thereby amplifying said signal.

9. In microwave apparatus employing stimulated emission of radiation and employing paramagnetic material in a magnetic field having relative rotation with respect thereto, in combination, means forming a doubly resonant cavity, paramagnetic material having two discreet energy levels of electrons and having an anisotropic $g$-value positioned within the cavity, said paramagnetic material being selected in accordance with the spin-lattice relaxation time thereof at a predetermined temperature of operation of the material and in accordance with the speed of said rotation, mounting means for said paramagnetic material, magnetic field producing means for producing an external magnetic field of predetermined substantially constant magnitude, means operatively connected to one of said mounting means and field producing means for causing said paramagnetic material to undergo relative rotation with respect to the magnetic field at a predetermined speed of rotation, said paramagnetic material including a plurality of paramagnetic crystals all of the same chemical composition in which the separation between the two energy levels and the material resonant frequency at which the material absorbs and radiates energy is a function of the strength of the magnetic field and is a function of the angle which the crystalline axis makes with said external magnetic field, means for feeding electromagnetic wave energy of a first frequency and of at least a predetermined amplitude into said cavity, said first frequency corresponding to the material resonant frequency in accordance with the instant separation between the two energy levels while the crystalline axis of any crystal makes a predetermined first angle with respect to said external magnetic field, said first angle being momentarily assumed by the axes of at least some of said plurality of crystals as the material undergoes relative rotation with respect to the magnetic field, said wave energy of first frequency being of sufficient amplitude whereby the material in said last named crystals undergoes adiabatic rapid passage and absorbs energy from said wave energy of first frequency while the crystal axes have said first angle and electrons are raised to the upper of said two energy levels by the process of adiabatic rapid passage, at any moment as the material undergoes rotation with respect to said external magnetic field the axes of some of said crystals being at said predetermined first angle whereby electrons are continuously raised to the upper of said two energy levels by adiabatic rapid passage and an inverted population distribution of electrons between said two energy levels is maintained in some of said plurality of crystals, means for cooling the cavity and paramagnetic material therein to said predtermined temperature, and means for conducting a signal of a second frequency to and from said cavity, said second frequency corresponding to the material resonant frequency while the crystal axis is at a second angle with respect to the external magnetic field, at any moment as the material undergoes rotation with respect to said external magnetic field the axes of some of said crystals being at said second angle, the speed of rotation being preselected in accordance with said predetermined temperature and said selected paramagnetic material whereby the time interval between the occurrence of the first angle in any one crystal and the occurrence of the second angle in said one crystal is short compared to the spin-lattice relaxation time of the material, said paramagnetic material giving up energy to said signal of second frequency thereby amplifying said signal.

10. Apparatus for amplifying electromagnetic wave energy by stimulated emission of radiation and employing paramagnetic material in a magnetic field having relative rotation with respect thereto comprising, in combination, means forming a doubly resonant cavity, paramagnetic material having an anisotropic $g$-value positioned within the cavity, said paramagnetic material having a plurality of discreet energy levels of electrons including a first level and a second level, said second level being higher than said first level, said paramagnetic material being selected in accordance with the spin-lattice relaxation time between said second level and said first level at a predtermined temperature of operation of the material and in accordance with the speed of said rotation, means for subjecting said paramagnetic material to an external magnetic field of predetermined direction and substantially constant magnitude, said paramagnetic material including a plurality of paramagnetic crystals all of the same chemical composition in which the separation between the energy levels and the resonant frequencies at which the material absorbs and radiates energy are functions of the strength of the magnetic field and of the angle which the crystalline axis makes with said external magnetic field, means operatively connected to the paramagnetic material for rotating said paramagnetic material at a predetermined speed within said cavity and within said external magnetic field, means for feeding electromagnetic wave energy of a first frequency and of at least a predetermined amplitude into said cavity, said first frequency corresponding to the material resonant frequency in accordance with the instant separation between the second energy level and the first energy level while the crystalline axis of any crystal makes a predetermined first angle with respect to said external magnetic field, said first angle being momentarily assumed by the axes of at least some of said plurality of crystals as the material is rotated, said wave energy of first frequency being of sufficient amplitude whereby the material in said last named crystals undergoes adiabatic rapid passage and absorbs energy from said wave energy of said first frequency while the crystal axes have said first angle and electrons are raised from the first energy level to the second energy level by the process of adiabatic rapid passage, at any moment as the material rotates within said external magnetic field the axes of some of said crystals being at said predetermined first angle whereby electrons are continuously raised from said first energy level to the said second energy level by adiabatic rapid passage and an inverted population distribution of electrons between said first and second energy levels is maintained in some of said plurality of crystals, the characteristics of said paramagnetic material being such that as the material rotates the spacing between any two energy levels of said plurality of energy levels other than the pair formed by the first and second energy levels never equals any spacing value which occurred between said first and second levels during the entire 360-degree rotation of the material, means for cooling the cavity and paramagnetic material therein to said predetermined temperature, and means for conducting a signal of a second frequency to and from said cavity, said second frequency corresponding to the material resonant frequency between said first and second energy levels while the crystal axis is at a second angle with respect to the external magnetic field, at any moment as the material rotates within said external magnetic field the axes of some of said crystals being at said second angle, the speed of rotation being preselected in accordance with said predetermined temperature and said selected paramagnetic material whereby the time interval between the occurrence of said first angle in any one crystal and the occurrence of said second angle in said one crystal is short compared to the spin-lattice relaxation time between the second energy level and the first energy level of the material, said paramagnetic material giving up energy to said signal of second frequency thereby amplifying said signal.

11. In apparatus employing stimulated emission of radiation and employing paramagnetic material in a magnetic field havin grelative rotation with respect thereto, the combination of means forming a doubly resonant cavity, paramagnetic material having an anisotropic $g$-value positioned within the cavity, said paramagnetic material having a plurality of discreet energy levels of electrons including a first energy level and a second energy level higher than said first energy level, said paramagnetic material being selected in accordance with the spin-lattice relaxation time between said second energy level and said first energy level at a predetermined temperature of operation of the material and in accordance with the speed of said rotation, means for subjecting said paramagnetic material to an external magnetic field of predetermined substantially constant magnitude and having relative rotation with respect thereto at a predtermined speed of rotation, said paramagnetic material including a plurality of paramagnetic crystals all of the same chemical composition in which the separation between the energy levels and the resonant frequencies at which the material absorbs and radiates energy are functions of the strength of the magnetic field and of the angle which the crystalline axis makes with said external magnetic field, means for feeding electromagnetic wave energy of a first frequency and of at least a predetermined amplitude into said cavity, said first frequency corresponding to the material resonant frequency in accordance with the instant separation between the second energy level and the first energy level while the crystalline axis of any crystal makes a predetermined first angle with respect to said external magnetic field, said first angle being momentarily assumed by the axes of at least some of said plurality of crystals as the material undergoes rotation with respect to said external magnetic field, said wave energy of first frequency being of sufficient amplitude whereby the material in said last named crystals undergoes adiabatic rapid passage and absorbs energy from said wave energy of first frequency while the crystal axes have said first angle and electrons are raised from said first energy level to said second energy level by the process of adiabatic rapid passage, at any moment as the material rotates with respect to the external magnetic field the axes of some of the said crystals being at said predetermined first angle whereby electrons are continuously raised from said first energy level to said second energy level by adiabatic rapid passage and an inverted population distribution of electrons between said first energy level and said second energy level is maintained in some of said plurality of crystals, the characteristics of said paramagnetic material being such that as the material undergoes relative rotation with respect to the external magnetic field the spacing between any two energy levels of said plurality of energy levels other than the pair formed by the first and second energy levels never equals any spacing value which occurred between said first and second energy levels during the entire 360-degree rotation, means for cooling the cavity and paramagnetic material therein to said predetermined temperature, and means for conducting a signal of a second frequency to and from said cavity, said second frequency corresponding to the material resonant frequency between said second and first energy levels while the crystal axis is at a second angle with respect to the external magnetic field, at any moment as the material undergoes relative rotation with respect to said external magnetic field the axes of some of said crystals being at said second angle, the speed or rotation being preselected in accordance with said predetermined temperature and said selected paramagnetic material whereby the time interval between the occurrence of the first angle in any one crystal and the occurrence of the second angle in said one crystal is short compared to the spin-lattice relaxation time between the second energy level and the first energy level of the material, said paramagnetic material giving up energy to said signal of second frequency thereby amplifying said signal.

References Cited in the file of this patent

UNITED STATES PATENTS

| | | |
|---|---|---|
| 2,762,871 | Dicke | Sept. 11, 1956 |
| 2,787,765 | Fox | Apr. 2, 1957 |
| 2,802,944 | Norton | Aug. 13, 1957 |

OTHER REFERENCES

Publication, Physical Review, vol. 99, No. 4, Aug. 15, 1955, pages 1264–1286. Articles on the Maser by Gordon et al. and Salweh.

Publication, IBM Journal July 1957, pages 232–237, Microwave "Amplification by Maser Techniques," by W. V. Smith.

Publication, Physical Review, vol. 104, No. 2, Oct. 15, 1956, pages 324–326. "Proposal for a New Type Solid State Maser" by Bloemberger.

Wittke: Proceedings of the IRE, vol. 45, March 1957, pages 291–316.

Bolef et al.: "IRE Transactions on Microwave Theory and Techniques," January 1958, pages 47–52 (pages 51–52 relied on).